July 20, 1965  S. E. PETERSON  3,195,597
MACHINE FOR CUTTING POTATOES INTO POTATO SEED
Filed June 3, 1963  3 Sheets-Sheet 1
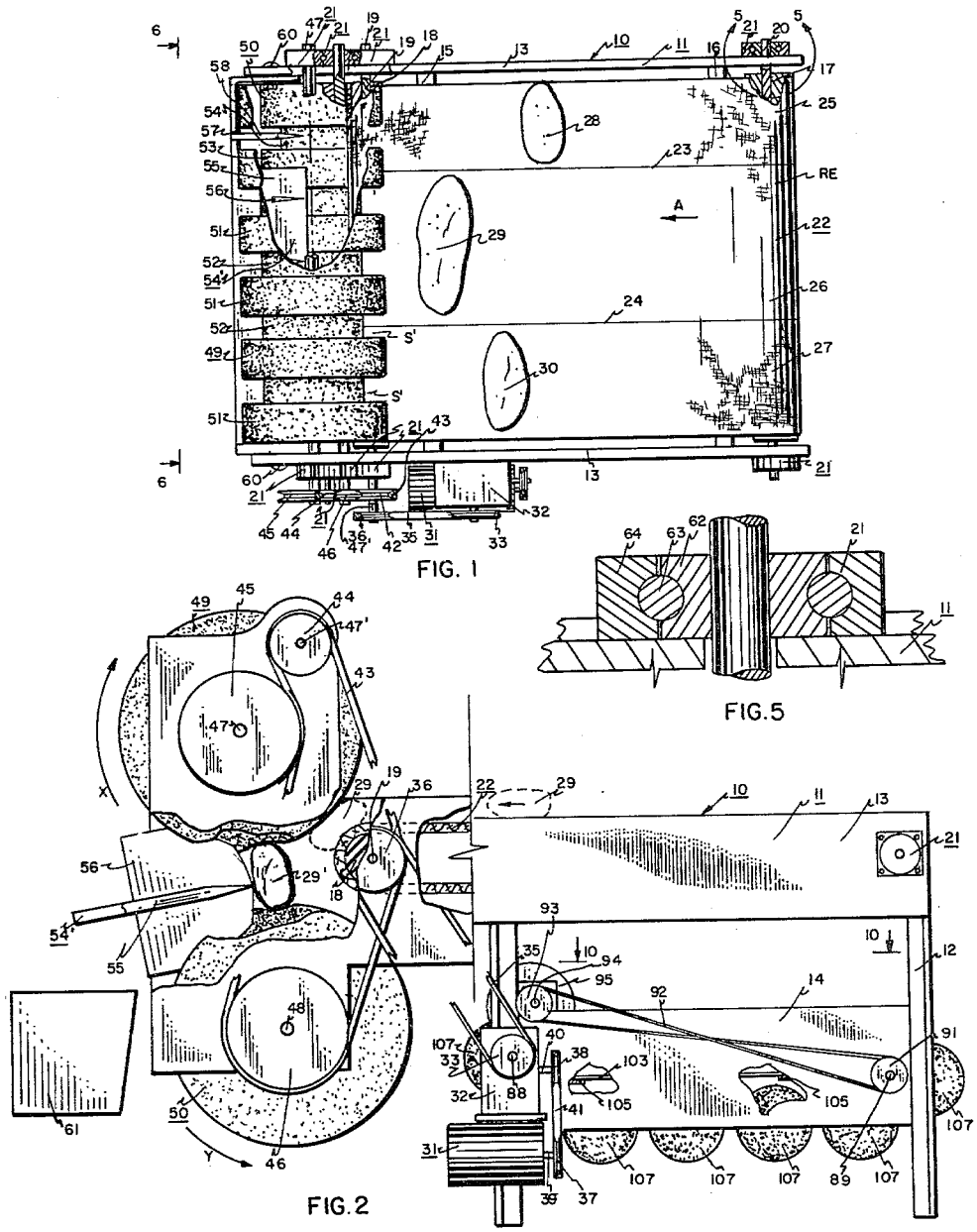
INVENTOR.
SOREN E. PETERSON
BY M. Ralph Shaffer
HIS ATTORNEY July 20, 1965 S. E. PETERSON 3,195,597
MACHINE FOR CUTTING POTATOES INTO POTATO SEED
Filed June 3, 1963 3 Sheets-Sheet 2
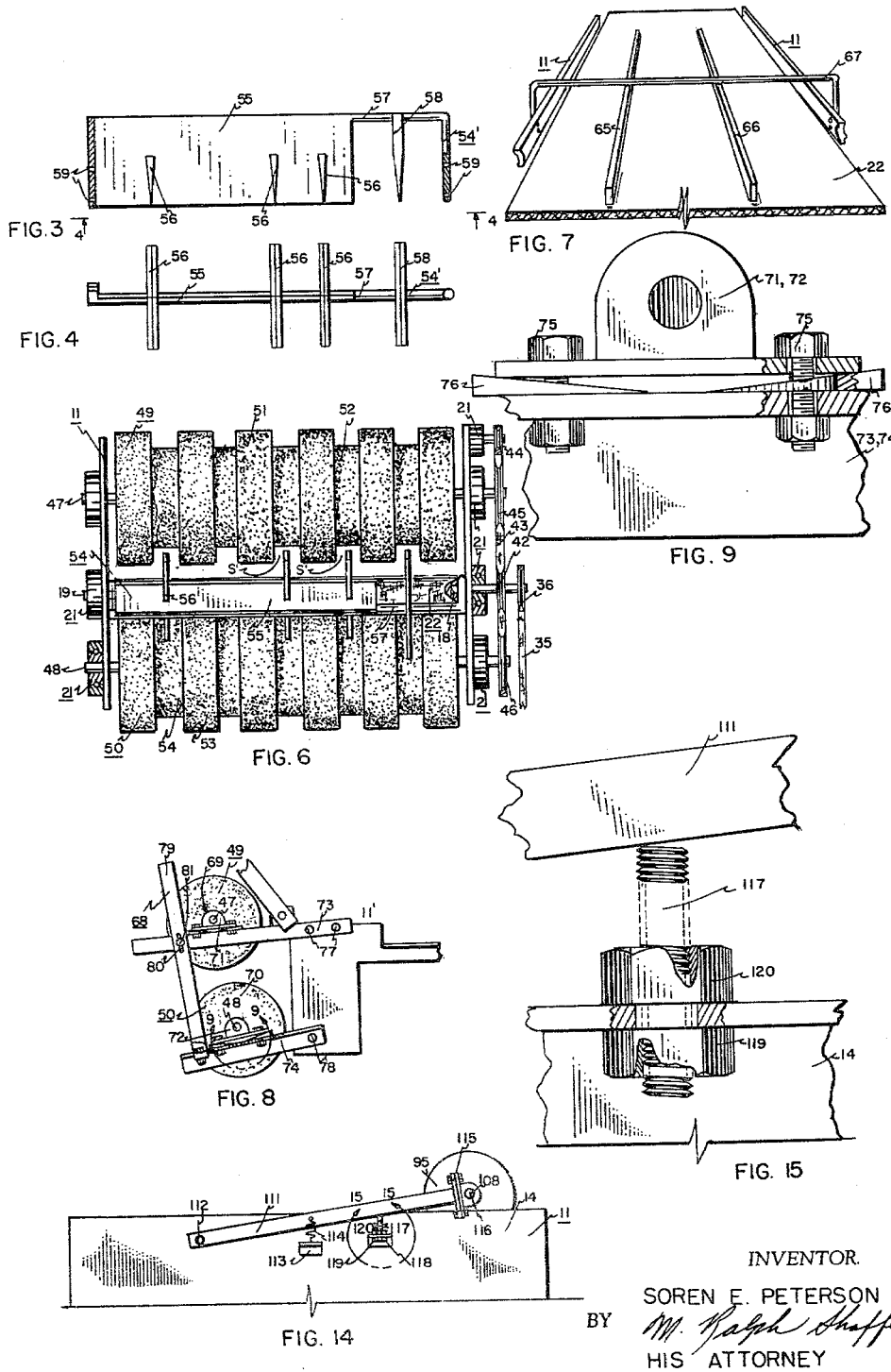
INVENTOR.
SOREN E. PETERSON
BY
HIS ATTORNEY July 20, 1965 S. E. PETERSON 3,195,597
MACHINE FOR CUTTING POTATOES INTO POTATO SEED
Filed June 3, 1963 3 Sheets-Sheet 3

INVENTOR.
SOREN E. PETERSON
BY *M. Ralph Shaffer*
HIS ATTORNEY

United States Patent Office 3,195,597
Patented July 20, 1965

3,195,597
MACHINE FOR CUTTING POTATOES INTO
POTATO SEED
Soren E. Peterson, 2689 South 3rd East,
Salt Lake City, Utah
Filed June 3, 1963, Ser. No. 284,909
6 Claims. (Cl. 146—164)

The present invention relates to potato seed cutting machine and, more particularly, to an improved machine for cutting potatoes into potato seed which will be highly reliable, versatile operation, and incorporate automatic feed and positioning features in order that desired cuttings may be made, thereby to improve the quality of the potato seed produced.

Accordingly, a principal object of the present invention is to provide a new and improved machine for cutting potatoes into potato seed.

A further object of the invention is to provide a low-cost conveyor type machine suitable for cutting potatoes of various sizes into seed, and this with suitable structure which will sustain discrete potato implacement so as to guide the potatoes properly and uniquely through the cutting mechanism.

A further object of the invention is to provide a potato seed cutter wherein potatoes will be uniquely and discretely revolved about their major axes a nominal 90° so that the cross-bar of the cutting means is enabled to make cuts through the minor axis of the potato cross-section, thereby enhancing the quality of the seed produced.

A further object of the invention is to provide a potato seed cutting machine wherein appropriate, roller-conveyor structure is supplied so that potatoes are translated in roller "pocket" to the cutting mechanism, being thereby uniquely positioned for desired cutting of potatoes of the small round type.

FIGURE 1 is a plan view, partially broken away in section for convenience of illustration, of a machine according to a preferred form of the invention.

FIGURE 2 is a side elevation of the structure shown in FIGURE 1, is fragmentary, broken away and enlarged at the left-hand section thereof to illustrate resilient roller means disposition and the operation of the machine in rotationally displacing potatoes to be cut into the cutting mechanism.

FIGURE 3 is a plan view of a cutter which may be used in the present invention.

FIGURE 4 is an elevation taken along the line 4—4 in FIGURE 3.

FIGURE 5 is an enlarged, fragmentary detail, partially in section, of representative bearing structure used throughout the present invention and is taken along the representative detail area 5—5 in FIGURE 1.

FIGURE 6 is an end elevation of the upper portion of the structure in FIGURE 1 and is taken along the line 6—6 in FIGURE 1; FIGURE 6 illustrates, in particular, the resilient roller means used in the upper structure of the machine.

FIGURE 7 is a fragmentary perspective, looking down, of an upper portion of a modified machine, according to the present invention, wherein guide partitions are used either with or in lieu of the conveyor belt indicia shown in FIGURE 1.

FIGURE 8 is an end elevation of a portion of the structure in FIGURE 1, when modified, illustrating that the resilient roller means may be adjusted as to mutual disposition and spacing from the end roller of the conveyor belt to accommodate the particular potatoes to be cut.

FIGURE 9 is an enlarged detail, taken along the line 9—9 of FIGURE 8, of a representative bearing and mount not in FIGURE 8.

FIGURES 10 and 11 are reversed in orientation relative to FIGURE 2.

FIGURE 14 is a fragmentary, simplified view of optional structure which may be employed in connection with the circular knife plurality so that the same may be adjusted as to height and be relieved for purposes of safety and long life of the machine.

FIGURE 15 is an enlarged fragmentary detail taken along the line 15—15 of FIGURE 14.

Figure 10:
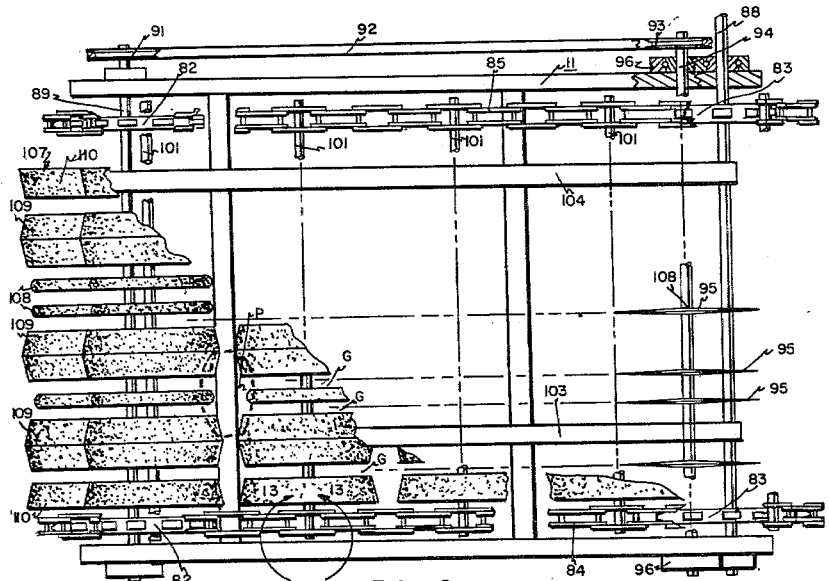
FIGURE 10 is a fragmentary, plan view of a lower portion of the structure in FIGURE 1, is taken along the line 10—10 in FIGURE 2, and, for convenience of illustration is rotated 180°.
Figure 11:
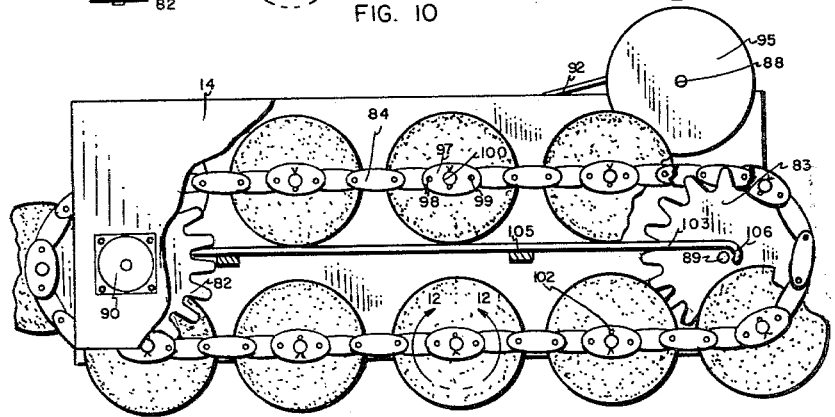
FIGURE 11 is a fragmentary, side elevation, partially broken away for convenience of illustration, of the structure shown in FIGURE 10; for convenience of illustration

In FIGURES 1 and 2 the potato cutting machine 10 of the invention is shown to include a stand 11 having legs 12, side plates 13 and 14 disposed on both sides thereof, and conventional cross-bars 15 and 16 disposed at the top and bottom of the stand in a conventional manner. Rollers 17 and 18 are journaled to the stand 11 by shafts 19 and 20 by means of bearings 21 at both ends thereof. Conventional adjustment means, not shown, may be employed to adjust the mutual spacing of shafts 19 and 20 in a conventional manner.

Conveyor belt 22 is made of conventional material such as rubber belting having an interior reinforcing web. Conveyor belt constructions are, of course, standard in the art. It is desired that a conveyor belt 22, looped over and tautly retained by rollers 17 and 18, have longitudinal indicia 23 and 24, such as painted lines, for example, which divide the belt into plural zones 25, 26 and 27. The number of indicia markings in zones may vary in accordance with the intended width and capacity of the machine being built. Individual potatoes 28, 29 and 30 are indicated as being disposed within their respective zones 25, 26 and 27. These potatoes will be placed initially upon the receiving end RE of the conveyor belt 22 and, since the conveyor belt progresses in a direction as shown by the arrow A, these potatoes 28-30 will be carried toward the roller and cutting structure about to be described. Before leaving consideration of the conveyor structure, however, it should be noted that there will be supplied a motor or other prime mover 31, see FIGURE 2, provided with gear box 32 the output from which is taken from pulley 33 and coupled by chain or belt drive 35 to the pulley (or sprocket) 36 keyed with roller 18 on shaft 19. Intercoupling between the motor or prime mover 31 and gear box 32 may be effected through pulleys 37 and 38 as keyed to motor output shaft 39 and gearbox input shaft 40, and by the inclusion of a belt drive 41.

Likewise keyed to shaft 19 is a pulley 42 which engages belt drive 43. The latter engages pulleys 44, 45 and 46, as shown in FIGURE 2, with pulley 44 being an idler pulley, keyed to shaft 47', and with pulleys 45 and 46 being keyed to shafts 47 and 48. Shafts 47', 47 and 48 are journaled to the stand side plates 13 (one on each side), and the latter two carry resilient, deformable friction roller means 49 and 50, preferably made of sponge rubber, respectively. The resilient deformable roller means are each preferably made up of a series of rollers 51 of large diameter, in FIGURE 1, and a series of rollers 52 of reduced diameter, with the rollers being so mounted upon the shaft 47 that friction, inter-keying, or other means keeps all the rollers 51 and 52 of each of the respective roller means 49 and 50 rotating in the same direction together. Directions of rotation of resilient roller means 49 and 50 are indicated by arrows X and Y. As to roller means 49, rotation is in a clockwise direction, with the sizes selected for the sprockets or pulley wheels, whichever is employed, in FIGURE 2 being such that the resilient, deformable roller means 49 and 50 rotate at equal surface speed which is about one-fourth faster than the surface speed of rotation of roller 18 carrying conveyor belt 22. This is to achieve rotation of potatoes preparatory to being cut, as hereinafter described.

Resilient, deformable roller means 50 is comprised of a series of large diameter resilient rollers 53 and reduced diameter resilient rollers 54 which intercooperate together in the same manner as illustrated and described in detail in connection with resilient rollers 51 and 52 of roller means 49.

Disposed between the two roller means 49 and 50 is a seed cutter 54' securely affixed to stand 11 and which preferably takes the form, see FIGURES 3 and 4, of a horizontally disposed transverse blade 55, permissively slightly declining rearwardly to allow potato juice to drop from the trailing edge of blade 55, and not onto the roller means, the blade having mounted thereon plural, mutually spaced, vertical blade elements 56. In a preferred form of the invention a U-configured member 57, see FIGURES 3 and 4, is welded or otherwise affixed to blade 55 and carries thereon one or more vertical elongate blade members 58 for making a desired number of vertical cuts through the potatoes. Mounting apertures 59 accommodate the entire cutter 54 for mounting to the stand 11 by attachments 60.

It is to be noted at this juncture that the resilient, deformable roller means 49 is proximately disposed with respect to conveyor belt 22 as it traverses about roller 18. Since by chosen design the resilient roller means 49 turns at a rate which is about one-fourth faster than the surface speed of conveyor belt 22 the potato 29, for example, shown in dotted line in FIGURE 2, is displaced gradually to achieve a nominal 90° disposition as at position 29' in FIGURE 2 relative to its disposition on the conveyor belt 22. The blade members 56 mounted upon blade 55, together with blade or blades 58, are separately aligned with zones 25–27 and so constructed, dimensioned and arranged, so as preferably to fit in the several spaces S' between adjacent large diameter rollers 51, for example, and the same will be true for the roller means 50, so that as each potato proceeds from position 29 to 29' as shown in FIGURE 2, the cutter at blade 55 will cut the potatoes through the minor axis of their transverse, vertical cross-section, into desired potato seed, this owing to the unique carrying of the potatoes through the cutter by means of the resilient, deformable, friction roller means 49 and 50.

In operation, then, the machine operates as follows. The user will first place the potatoes in the proper zones 25–27 and permit the conveyor belt 22 to proceed to the left in a direction A so that the potatoes advance toward the cutter 54 and resilient deformable roller means 49 and 50. The zones as delinated by indicia 23 and 24 guide the potatoes to the cutter 54 in appropriate alignment so that a desired number of vertical cuts may be made. The construction and mutual placement of the component parts of the machine as shown in FIGURE 2 are such as to permit a 90° displacement of the potato, relative to its cross-section, as the same proceeds toward cutter 54', so that the potato will be cut longitudinally along the minor axis of its transverse cross-section. This is preferable in order that the most potato seed be obtained. Subsequently, the friction roller means 49 and 50 will advance the potato 29 through the cutter 54 so that desired seed cuttings may be obtained. If desired, a bin or sack 61 may be provided to collect the seed cuttings as they are produced by the machine.

FIGURE 5 depicts, substantially in cross-section, a representative bearing 21 which may be utilized for the journaling of any of the shafts 19, 20, 47 and 48. In fact, the construction shown in FIGURE 5 will apply not only to the above structure hereinbefore described but also to subsequent structure where bearings are needed. The inner race 62 of the bearing 21 will be pressed onto a respective shaft as shown, and ball 63 included provides a bearing engagement with the outer race 64 which is secured to the structure in a conventional manner.

FIGURE 7 indicates that in addition to or in lieu of the indicia 23 and 24 there may be included zone delineating guides or partitions 65 and 66 which space the zones 25–27 in a manner as indicated in FIGURE 6, and with the guides 65 and 66 being suspended above conveyor belt 22 and being attached to stand 11 by means of interconnecting framework 67.

FIGURE 8 is a simplified view of representative, opposite, side structure shown in FIGURE 2 wherein the modified side panel 11' (one on each side) includes brace support structure 68 for supporting the journal mountings 69 and 70 of resilient roller means 49 and 50, respectively. Shafts 47 and 48 are journaled in bearings 71 and 72. These bearing mounts, as illustrated in FIGURE 9, may be mounted upon braces 73 and 74 by means of bolt attachments 75 and slotted shims 76. The shims accommodate vertical height adjustment of the bearings 71 and 72. Bolts 77 secure braces 73 to panel 11'. Correspondingly, bolt 78 secures brace 73 to panel 11'. Cross-brace 79 is slotted at 80 to accommodate the attachments 81 affixed to brace 68. Attachments 81 may be simply bolt and nut attachments which, when loosened, permit the brace 74 to drop downwardly in a counter-clockwise direction about attachment 78 so as to increase the spacing between the roller means 49 and 50. Inclinations as well as slight tilting adjustments may facilitate proper adjustments so that appropriate potato rotation is achieved as is shown in FIGURE 2, such adjustment being possible by the provision of shims 76.

FIGURE 10 is a plan view, partially broken away for convenience of illustration, of certain lower cutting structure which may advantageously be employed in the present invention and is taken along the line 10—10 in FIGURE 2. FIGURES 10–13 pertain to the same structure and so will be discussed together. Side plates 14 are disposed upon both sides of stand 11. Journaled to plates 14 are sprockets 82 and 83, two of each of which are disposed upon either side of the frame. Endless sprocket chains 84 and 85 intercouple the sprockets as shown.

Shaft 88 of gear-box 32 is shown broken away in FIGURE 10 and mounts the driven sprocket 83 thereto. This supplies a drive to this part of the system. Sprockets 82 are keyed to shaft 89 which in turn is journaled to the support frame by bearings 90. This shaft 89 carries a pulley wheel 91 which is coupled by belt 92 to pulley wheel 93 keyed to shaft 94, the latter carrying keyed circular knife blades 95 in selected spaced relationship. Shaft 94 is journaled in frame bearings 96 in a conventional manner. Thus, it is seen that the drive motor 31 supplies power to this lower system so as to drive the sprocket chain assemblies through sprockets 83 and also supply power to rotationally drive the circular blades 95.

Figure 12:
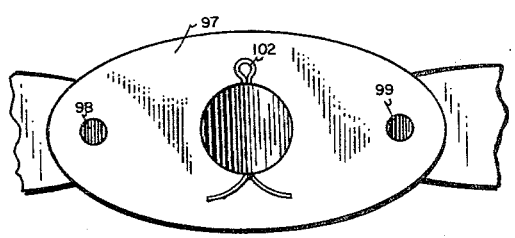
FIGURE 12 is an enlarged detail, taken along the line 12—12 in FIGURE 11, of a representative portion of the chain structure.
Figure 13:
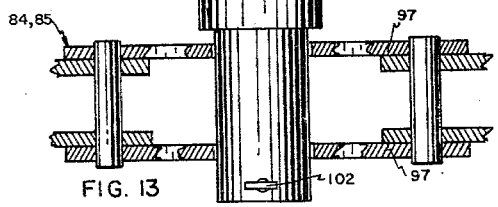
FIGURE 13 is an enlarged detail taken along the line 13—13 in FIGURE 10.

Each of the chains 85 includes oversized links 97, see FIGURES 12, 13, which are appropriately drilled to be pinned at 98 and 99 to the respective chains 84, 85 in a conventional manner and which are bored at 100 to receive the respective, shouldered, end extremities of shafts 101. Each of the shafts 101 has its opposite ends received in the respective chains 84, 85, with the extremities being retained in the latter by a plurality of cotter keys 102. The frame structure includes tracks 103 and 104 which are supported by cross-bars 105 and have forward extremities 106 which are curved downwardly. Each of the shafts 101 is provided with a respective, appropriately contoured roller means 107, preferably rubber, which may comprise thin rollers 108, larger double-surfaced rollers 109, and frusto-conical end rollers 110. These rollers will be provided as in the aligned manner shown in FIGURE 10 so as to "seat" the potatoes, in their conveyance to the knife blades 95, as to anticipated size. It will be noted in FIGURE 10 that two small roller members 108 are disposed between two of the larger roller members 109, whereas in another place one thin roller member is disposed between two of the larger roller members 109. These rollers are configured so as to carry the potatoes nestled in between adjacent parallel roller means and also to carry them at "pocket" areas as at P in FIGURE 10 which are appropriately aligned with one or more circular knife blades 95 in respective registry with the gaps G between adjacent roller members. These roller means roll along tracks 103 and 104 so as to rotate the potatoes in a counter-clockwise direction as they approach the knife means 95. A reverse rotation of the circular knives 95 facilitates cutting of the potatoes into desired pieces. The structure of FIGURES 10–13 is intended primarily for small potatoes of generally round configuration wherein transverse cuts as made by the structure (55) of FIGURES 1, 3 and 4 are not needed.

FIGURES 14 and 15 illustrate a representative way in which the several knives 95, mounted upon shaft 108, may be adjusted up and down in accordance with proper knife disposition. Bars 111 are pivotally attached by attachments 112 to side panel 14, and panels 14 individually include brackets 113 and 118. Springs 114 are secured to and between respective brackets 113 and their respective bars 111. The ends of the bars are provided with bearing mounts 115 accommodating bearings 116 which are preferably self-aligned bearings. An adjustable stud or bolt 117 is secured to additional side panel bracket 118 and is provided with lock nut 119 for securing the appropriate disposition of circular knives 95.

The purpose for the inclusion of the spring is to permit the bars 111 to lift up at the knife area, i.e. rotate counter-clockwise about pivot attachments 112 so as to relieve the structure where hard objects such as rocks are encountered by the rotating knives. FIGURE 15 illustrates an enlarged detail of the structure of FIGURE 14 at the detail 15—15, showing the stud 117 and cooperating lock nuts 119 and 120.

The structure thus described in FIGURES 10–15 operate as follows. In referring first to FIGURE 10, it is seen that the operator will deposit potatoes onto the rollers which will be self-centering by virtue of their composite, contoured configuration. Thus, the potatoes in the several pockets P, for example, will be advanced toward the rotating circular knives 95 to be slit vertically in two or more pieces. It is noted that this structure is driven by the same power means as that shown in FIGURES 1 and 2.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A potato seed cutting machine including, in combination, a stand; mutually spaced, initial and terminal rollers disposed in a horizontal plane and journaled to said stand; a conveyor belt mounted upon and over said rollers; means for driving at least one of said rollers mechanically coupled thereto; mutually spaced, upper and lower, horizontally disposed, resilient, deformable, friction roller means journaled to said frame and disposed parallel to and proximate said terminal roller; knife means transversely disposed with respect to said frame and medially disposed between said friction roller means for cutting potatoes into seed, said knife means, friction roller means, conveyor belt, and conveyor belt terminal roller being so constructed and arranged with respect to each other that potatoes placed upon said conveyor belt are translated thereby for passage along said conveyor belt toward said terminal roller and from there frictionally through the space between said upper friction roller means and said conveyor belt terminal roller proximate thereto for frictional transport thereby to and through both of said resilient deformable roller means for the frictional thrusting by the latter through said knife means, and means for counter-rotating said friction roller means to effect said frictional transport through said knife means, said terminal roller being so positioned with respect to said friction roller means that that portion of said conveyor belt which at any one time engages said terminal roller is disposed at least in part between said upper and lower, resilient, deformable, friction roller means.

2. A potato seed cutting machine including, in combination, a stand; mutually spaced, initial and terminal rollers disposed in a horizontal plane and journaled to said stand; a conveyor belt mounted upon and over said rollers; means for driving at least one of said rollers mechanically coupled thereto; mutually spaced, upper and lower, horizontally disposed, resilient, deformable, friction roller means journaled to said frame and disposed parallel to and proximate said terminal roller; knife means transversely disposed with respect to said frame and medially disposed between said friction roller means for cutting potatoes into seed, said knife means, friction roller means, conveyor belt, and conveyor belt terminal roller being so constructed and arranged with respect to each other that potatoes placed upon said conveyor belt are translated thereby for passage along said conveyor belt toward said terminal roller and from there frictionally through the space between said upper friction roller means and said conveyor belt terminal roller proximate thereto for frictional transport thereby to and through both of said resilient deformable roller means for the frictional thrusting by the latter through said knife means, and means for counter-rotating said friction roller means to effect said frictional transport through said knife means, and wherein said friction roller means each comprise mutually spaced, plural rollers of one diameter and plural rollers of another diameter respectively disposed therebetween, progressively, said knife means comprising an elongate transverse blade disposed parallel to the axes of said resilient deformable roller means and plural, vertical blade elements secured to and mutually spaced along said blade and disposed in the open areas between adjacent ones of said roller members of said one diameter with respect to both of said resilient deformable roller means.

3. Structure according to claim 2 wherein said machine includes guide means secured to said stand and disposed over said conveyor belt for determining parallel, adjacent zones, registered with said knife means, so as to facilitate potato placement in respective ones of said zones.

4. Structure according to claim 1 wherein said friction roller means counter-rotating means is so constructed and arranged that the surface speed of said resilient, deformable, friction roller means when driven is normally 1¼ times the surface speed of said conveyor belt as driven by said power means.

5. Structure according to claim 2 wherein said knife means includes auxiliary relieved structure including auxiliary, elongate blade means nominally parallel to said blade elements and spaced from said principle blade and respectively disposed in others of the spaces between adjacent ones of said roller members of said one diameter.

6. In combination, upper and lower resilient, deformable, friction roller means mutually vertically spaced apart and having parallel horizontal axes of rotation; cutting means disposed between said resilient deformable roller means, said cutting means and said resilient deformable roller means being so constructed and arranged that said resilient, deformable, friction roller means is capable of frictionally retaining an object therebetween and passing the same through said cutting means; and conveyor means for introducing objects to be cut to and between said resilient, deformable, friction roller means, said conveyor means and upper friction roller means being mutually constructed and arranged for revolvably displacing an object carried by said conveyor means in magnitude and direction such that said object is cut by said cutting means nominally along the minor axis of its cross section.

References Cited by the Examiner

UNITED STATES PATENTS

| | | | |
|---|---|---|---|
| 623,753 | 4/99 | Winchell | 146—73 X |
| 858,248 | 6/07 | Adam. | |
| 2,597,279 | 5/52 | Bailey | 146—73 |
| 2,699,806 | 1/55 | Gardner | 146—32 |
| 2,705,986 | 4/55 | Wetzel | 146—164 |
| 2,722,256 | 11/55 | Hise | 146—164 |
| 2,827,089 | 3/58 | Amor | 146—73 |

ROBERT C. RIORDON, *Primary Examiner.*

J. SPENCER OVERHOLSER, *Examiner.*